US012081427B2

(12) United States Patent
Sattinger et al.

(10) Patent No.: US 12,081,427 B2
(45) Date of Patent: Sep. 3, 2024

(54) TIME-SYNCHRONIZATION TESTING IN A NETWORK ELEMENT

(71) Applicant: MELLANOX TECHNOLOGIES, LTD., Yokneam (IL)

(72) Inventors: Arnon Sattinger, Zichron Yaakov (IL); Dotan David Levi, Kiryat Motzkin (IL); Avraham Ganor, Shoham (IL); Shahar Givony, Ramat Yishai (IL); Nimer Khazen, Bu'ayna Village (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 0 days.

(21) Appl. No.: 17/191,736

(22) Filed: Mar. 4, 2021

(65) Prior Publication Data
US 2021/0328900 A1 Oct. 21, 2021

Related U.S. Application Data

(60) Provisional application No. 63/012,292, filed on Apr. 20, 2020.

(51) Int. Cl.
*H04L 43/50* (2022.01)
*H04L 43/08* (2022.01)
*H04L 43/10* (2022.01)

(52) U.S. Cl.
CPC .............. *H04L 43/50* (2013.01); *H04L 43/08* (2013.01); *H04L 43/10* (2013.01)

(58) Field of Classification Search
CPC ......... H04L 43/50; H04L 43/08; H04L 43/10; H04J 3/0697
See application file for complete search history.

(56) References Cited

U.S. PATENT DOCUMENTS

| 5,392,421 A | 2/1995 | Lennartsson |
| 5,402,394 A | 3/1995 | Turski |
| 5,416,808 A | 5/1995 | Witsaman et al. |
| 5,491,792 A | 2/1996 | Grisham et al. |
| 5,564,285 A | 10/1996 | Jurewicz et al. |

(Continued)

FOREIGN PATENT DOCUMENTS

| CN | 106817183 A | 6/2017 |
| CN | 108829493 A | 11/2018 |

(Continued)

OTHER PUBLICATIONS

IEEE Standard 1588™-2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.

(Continued)

*Primary Examiner* — Patrice L Winder
(74) *Attorney, Agent, or Firm* — MEITAR PATENTS LTD.

(57) ABSTRACT

A pluggable module, for testing time-synchronization signals of network elements, includes a first connector for connecting to test equipment, a second connector for connecting to a network port of a network element, and at least one driver. The at least one driver is connected between the first and second connectors and is configured to buffer and relay a time-synchronization signal between the network element and the test equipment.

23 Claims, 7 Drawing Sheets

(56) References Cited

U.S. PATENT DOCUMENTS

| | | | |
|---|---|---|---|
| 5,592,486 A | 1/1997 | Lo et al. | |
| 5,896,524 A | 4/1999 | Halstead, Jr. et al. | |
| 6,055,246 A | 4/2000 | Jones | |
| 6,084,856 A | 7/2000 | Simmons et al. | |
| 6,144,714 A | 11/2000 | Bleiweiss et al. | |
| 6,199,169 B1 | 3/2001 | Voth | |
| 6,289,023 B1 | 9/2001 | Dowling et al. | |
| 6,449,291 B1 | 9/2002 | Burns et al. | |
| 6,535,926 B1 | 3/2003 | Esker | |
| 6,556,636 B1 | 4/2003 | Takagi | |
| 6,556,638 B1 | 4/2003 | Blackburn | |
| 6,718,476 B1 | 4/2004 | Shima | |
| 6,918,049 B2 | 7/2005 | Lamb et al. | |
| 7,111,184 B2 | 9/2006 | Thomas, Jr. et al. | |
| 7,191,354 B2 | 3/2007 | Purho | |
| 7,245,627 B2 | 7/2007 | Goldenberg et al. | |
| 7,254,646 B2 | 8/2007 | Aguilera et al. | |
| 7,334,124 B2 | 2/2008 | Pham et al. | |
| 7,412,475 B1 | 8/2008 | Govindarajalu | |
| 7,440,474 B1 | 10/2008 | Goldman et al. | |
| 7,447,975 B2 | 11/2008 | Riley | |
| 7,483,448 B2 | 1/2009 | Bhandari et al. | |
| 7,496,686 B2 | 2/2009 | Coyle | |
| 7,535,933 B2 | 5/2009 | Zerbe et al. | |
| 7,623,552 B2 | 11/2009 | Jordan et al. | |
| 7,636,767 B2 | 12/2009 | Lev-Ran et al. | |
| 7,650,158 B2 | 1/2010 | Indirabhai | |
| 7,656,751 B2 | 2/2010 | Rischar et al. | |
| 7,750,685 B1 | 7/2010 | Bunch et al. | |
| 7,904,713 B1 | 3/2011 | Zajkowski et al. | |
| 7,941,684 B2 | 5/2011 | Serebrin et al. | |
| 8,065,052 B2 | 11/2011 | Fredriksson et al. | |
| 8,300,749 B2 | 10/2012 | Hadzic et al. | |
| 8,341,454 B1 | 12/2012 | Kondapalli | |
| 8,370,675 B2 | 2/2013 | Kagan | |
| 8,407,478 B2 | 3/2013 | Kagan et al. | |
| 8,607,086 B2 | 12/2013 | Cullimore | |
| 8,699,406 B1 | 4/2014 | Charles et al. | |
| 8,879,552 B2 | 11/2014 | Zheng | |
| 8,930,647 B1 | 1/2015 | Smith | |
| 9,344,265 B2 | 5/2016 | Karnes | |
| 9,397,960 B2 | 7/2016 | Arad et al. | |
| 9,549,234 B1* | 1/2017 | Mascitto | H04L 43/0811 |
| 9,942,025 B2 | 4/2018 | Bosch et al. | |
| 9,979,998 B1 | 5/2018 | Pogue et al. | |
| 10,014,937 B1 | 7/2018 | Di Mola et al. | |
| 10,027,601 B2 | 7/2018 | Narkis et al. | |
| 10,054,977 B2 | 8/2018 | Mikhaylov et al. | |
| 10,164,759 B1 | 12/2018 | Volpe | |
| 10,320,646 B2 | 6/2019 | Mirsky et al. | |
| 10,637,776 B2* | 4/2020 | Iwasaki | H04L 49/355 |
| 10,727,966 B1 | 7/2020 | Izenberg et al. | |
| 11,379,334 B1 | 7/2022 | Srinivasan et al. | |
| 2001/0006500 A1 | 7/2001 | Nakajima et al. | |
| 2002/0027886 A1 | 3/2002 | Fischer et al. | |
| 2002/0031199 A1 | 3/2002 | Rolston et al. | |
| 2004/0096013 A1 | 5/2004 | Aturell et al. | |
| 2004/0153907 A1 | 8/2004 | Gibart | |
| 2005/0033947 A1 | 2/2005 | Morris et al. | |
| 2005/0268183 A1* | 12/2005 | Barmettler | H04L 43/50 714/712 |
| 2006/0109376 A1 | 5/2006 | Chaffee et al. | |
| 2007/0008044 A1 | 1/2007 | Shimamoto | |
| 2007/0072451 A1* | 3/2007 | Tazawa | H04L 43/50 439/76.1 |
| 2007/0104098 A1 | 5/2007 | Kimura et al. | |
| 2007/0124415 A1 | 5/2007 | Lev-Ran et al. | |
| 2007/0139085 A1 | 6/2007 | Elliot et al. | |
| 2007/0159924 A1 | 7/2007 | Vook et al. | |
| 2007/0266119 A1 | 11/2007 | Ohly | |
| 2008/0069150 A1 | 3/2008 | Badt et al. | |
| 2008/0225841 A1 | 9/2008 | Conway et al. | |
| 2008/0285597 A1 | 11/2008 | Downey et al. | |
| 2009/0257458 A1 | 10/2009 | Cui et al. | |
| 2010/0280858 A1* | 11/2010 | Bugenhagen | H04L 43/00 709/224 |
| 2011/0182191 A1* | 7/2011 | Jackson | H04L 43/50 370/250 |
| 2011/0194425 A1* | 8/2011 | Li | H04L 43/50 370/252 |
| 2012/0063556 A1 | 3/2012 | Hoang | |
| 2012/0076319 A1 | 3/2012 | Terwal | |
| 2012/0301134 A1 | 11/2012 | Davari et al. | |
| 2013/0039359 A1 | 2/2013 | Bedrosian | |
| 2013/0045014 A1* | 2/2013 | Mottahedin | H04L 63/06 455/90.3 |
| 2013/0215889 A1 | 8/2013 | Zheng et al. | |
| 2013/0235889 A1 | 9/2013 | Aweya et al. | |
| 2013/0294144 A1 | 11/2013 | Wang et al. | |
| 2013/0315265 A1 | 11/2013 | Webb et al. | |
| 2013/0336435 A1 | 12/2013 | Akkihal et al. | |
| 2014/0085141 A1* | 3/2014 | Geva | H04J 3/0644 368/46 |
| 2014/0153680 A1 | 6/2014 | Garg et al. | |
| 2014/0185216 A1 | 7/2014 | Zeng et al. | |
| 2014/0185632 A1 | 7/2014 | Steiner et al. | |
| 2014/0253387 A1 | 9/2014 | Gunn et al. | |
| 2014/0281036 A1 | 9/2014 | Cutler et al. | |
| 2014/0301221 A1* | 10/2014 | Nadeau | H04L 43/50 370/252 |
| 2014/0321285 A1* | 10/2014 | Chew | H04L 43/50 370/236 |
| 2015/0019839 A1 | 1/2015 | Cardinell et al. | |
| 2015/0078405 A1 | 3/2015 | Roberts | |
| 2015/0092793 A1 | 4/2015 | Aweya | |
| 2015/0127978 A1 | 5/2015 | Cui et al. | |
| 2015/0163050 A1 | 6/2015 | Han et al. | |
| 2015/0318941 A1 | 11/2015 | Zheng et al. | |
| 2016/0057518 A1* | 2/2016 | Neudorf | G02B 6/4292 398/45 |
| 2016/0072602 A1* | 3/2016 | Earl | H04J 3/0697 709/248 |
| 2016/0110211 A1 | 4/2016 | Kames | |
| 2016/0140066 A1 | 5/2016 | Worrell et al. | |
| 2016/0277138 A1 | 9/2016 | Garg et al. | |
| 2016/0285574 A1 | 9/2016 | White et al. | |
| 2016/0315756 A1* | 10/2016 | Tenea | H04J 3/0667 |
| 2017/0005903 A1 | 1/2017 | Mirsky | |
| 2017/0017604 A1 | 1/2017 | Chen et al. | |
| 2017/0126589 A1 | 5/2017 | Estabrooks et al. | |
| 2017/0160933 A1 | 6/2017 | De Jong et al. | |
| 2017/0214516 A1 | 7/2017 | Rivaud et al. | |
| 2017/0302392 A1 | 10/2017 | Farra et al. | |
| 2017/0331926 A1 | 11/2017 | Raveh et al. | |
| 2017/0359137 A1 | 12/2017 | Butterworth et al. | |
| 2018/0059167 A1* | 3/2018 | Sharf | H01R 13/717 |
| 2018/0152286 A1 | 5/2018 | Kemparaj et al. | |
| 2018/0188698 A1 | 7/2018 | Dionne et al. | |
| 2018/0191802 A1 | 7/2018 | Yang et al. | |
| 2018/0227067 A1 | 8/2018 | Hu et al. | |
| 2018/0309654 A1* | 10/2018 | Achkir | H04L 43/50 |
| 2019/0007189 A1 | 1/2019 | Hossain et al. | |
| 2019/0014526 A1 | 1/2019 | Bader et al. | |
| 2019/0089615 A1 | 3/2019 | Branscomb et al. | |
| 2019/0149258 A1* | 5/2019 | Araki | H04B 10/07957 398/83 |
| 2019/0158909 A1 | 5/2019 | Kulkarni et al. | |
| 2019/0196563 A1 | 6/2019 | Lai | |
| 2019/0273571 A1 | 9/2019 | Bordogna et al. | |
| 2019/0319729 A1 | 10/2019 | Leong et al. | |
| 2019/0349392 A1 | 11/2019 | Wetterwald et al. | |
| 2019/0379714 A1 | 12/2019 | Levi et al. | |
| 2020/0162234 A1 | 5/2020 | Almog et al. | |
| 2020/0169379 A1 | 5/2020 | Gaist et al. | |
| 2020/0235905 A1 | 7/2020 | Su et al. | |
| 2020/0304224 A1 | 9/2020 | Neugeboren | |
| 2020/0331480 A1 | 10/2020 | Zhang et al. | |
| 2020/0344333 A1 | 10/2020 | Hawari et al. | |
| 2020/0396050 A1* | 12/2020 | Perras | H04L 7/0075 |
| 2020/0401434 A1 | 12/2020 | Thampi et al. | |
| 2021/0218431 A1* | 7/2021 | Narayanan | H04W 80/10 |
| 2021/0297230 A1 | 9/2021 | Dror et al. | |

(56) References Cited

U.S. PATENT DOCUMENTS

| | | |
|---|---|---|
| 2021/0318978 A1 | 10/2021 | Hsung |
| 2021/0409031 A1 | 12/2021 | Ranganathan et al. |
| 2022/0066978 A1 | 3/2022 | Mishra et al. |
| 2022/0239549 A1 | 7/2022 | Zhao et al. |
| 2022/0342086 A1 | 10/2022 | Yoshida |

FOREIGN PATENT DOCUMENTS

| | | | |
|---|---|---|---|
| EP | 1215559 B1 | 9/2007 | |
| EP | 2770678 A1 | 8/2014 | |
| JP | 2011091676 A | 5/2011 | |
| WO | 2012007276 A1 | 1/2012 | |
| WO | 2013124782 A2 | 8/2013 | |
| WO | 2013143112 A1 | 10/2013 | |
| WO | 2014029533 A1 | 2/2014 | |
| WO | WO-2014138936 A1 * | 9/2014 | ............. H04L 43/50 |

OTHER PUBLICATIONS

Weibel et al., "Implementation and Performance of Time Stamping Techniques", 2004 Conference on IEEE 1588, pp. 1-29, Sep. 28, 2004.

Working Draft Project American National Standard T10/1799-D, "Information Technology—SCSI Block Commands—3 (SBC-3)", pp. 1-220, Revision 19, May 29, 2009.

"Infiniband Architecture: Specification Volume 1", pp. 1-1727, Release 1.2.1, Infiniband Trade Association, Nov. 2007.

Mellanox Technologies, "Mellanox ConnectX IB: Dual-Port InfiniBand Adapter Cards with PCI Express 2.0", pp. 1-2, USA, year 2008.

Wikipedia—"Precision Time Protocol", pp. 1-8, Aug. 24, 2019.

Levi et al., U.S. Appl. No. 16/779,611, filed Feb. 2, 2020.

Weibel, H., "High Precision Clock Synchronization according to IEEE 1588 Implementation and Performance Issues", Zurich University of Applied Sciences, pp. 1-9, Jan. 17, 2005.

Lu et al., "A Fast CRC Update Implementation", Computer Engineering Laboratory, Electrical Engineering Department, pp. 113-120, Oct. 8, 2003.

Levi et al., U.S. Appl. No. 16/799,873, filed Feb. 25, 2020.

Dlugy-Hegwer et al., "Designing and Testing IEEE 1588 Timing Networks", Symmetricom, pp. 1-10, Jan. 2007.

Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.

ITU-T recommendation, "G.8273.2/Y.1368.2—Timing characteristics of telecom boundary clocks and telecom time slave clocks", pp. 1-50, Jan. 2017.

Texas Instruments, "LMK05318 Ultra-Low Jitter Network Synchronizer Clock With Two Frequency Domains," Product Folder, pp. 1-86, Dec. 2018.

Ravid et al., U.S. Appl. No. 16/920,772, filed Jul. 6, 2020.

Sela et al., U.S. Appl. No. 16/900,931, filed Jun. 14, 2020.

Levi et al., U.S. Appl. No. 17/120,313, filed Dec. 14, 2020.

Mula et al., U.S. Appl. No. 17/148,605, filed Jan. 14, 2021.

IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.

U.S. Appl. No. 16/683,309 Office Action dated Sep. 17, 2021.

U.S. Appl. No. 16/920,722 Office Action dated Aug. 12, 2021.

IPclock, "IEEE 1588 Primer," ip-clock.com, pp. 1-3, May 1, 2017 (downloaded from https://web.archive.org/web/20170501192647/http://ip-clock.com/IEEE-1588-primer/).

U.S. Appl. No. 16/900,931 Office Action dated Apr. 28, 2022.

U.S. Appl. No. 16/683,309 Office Action dated Mar. 17, 2022.

U.S. Appl. No. 16/779,611 Office Action dated Mar. 17, 2022.

U.S. Appl. No. 17/120,313 Office Action dated Mar. 28, 2022.

EP Application # 21214269 Search Report dated May 2, 2022.

U.S. Appl. No. 17/148,605 Office Actiondated May 17, 2022.

EP Application # 22151451.6 Search Report dated Jun. 17, 2022.

U.S. Appl. No. 16/779,611 Office Action dated Jun. 24, 2022.

U.S. Appl. No. 17/120,313 Office Action dated Aug. 29, 2022.

ITU-T Standard G.8264/Y.1364, "Distribution of timing information through packet networks", pp. 1-42, Aug. 2017.

ITU-T Standard G.8262/Y.1362, "Timing characteristics of synchronous equipment slave clock", pp. 1-44, Nov. 2018.

"Precision Time Protocol," PTP Clock Types, CISCO, pp. 1-52, Jul. 30, 2020, as downloaded from https://www.cisco.com/c/en/US/td/docs/dcn/aci/apic/5x/system-management-configuration/cisco-apic-system-management-configuration-guide-52x/m-precision-time-protocol.pdf.

ITU-T Standard G.8261/Y.1361, "Timing and synchronization aspects in packet networks", pp. 1-120, Aug. 2019.

U.S. Appl. No. 17/579,630 Office Action dated Oct. 24, 2022.

U.S. Appl. No. 17/579,630 Office Action dated Jan. 12, 2023.

U.S. Appl. No. 17/670,540 Office Action dated Jan. 18, 2023.

"IEEE Standard for Local and Metropolitan Area Networks—Timing and Synchronization for Time-Sensitive Applications," IEEE Std 802.1AS-2020, pp. 1-421, year 2020.

U.S. Appl. No. 17/549,949 Office Action dated Mar. 30, 2023.

U.S. Appl. No. 17/871,937 Office Action dated Aug. 1, 2023.

U.S. Appl. No. 17/578,115 Office Action dated Apr. 26, 2023.

U.S. Appl. No. 17/534,776 Office Action dated Jun. 29, 2023.

SiTime Corporation, "Sit5377—60 to 220 MHZ, ±100 ppb Elite RF™ Super-TCXO," Product Description, pp. 1-3, last updated Mar. 18, 2023 as downloaded from https://web.archive.org/web/20230318094421/https://www.sitime.com/products/super-tcxos/sit5377.

PCI-SIG, "PCI Express®—Base Specification—Revision 3.0," pp. 1-860, Nov. 10, 2010.

* cited by examiner

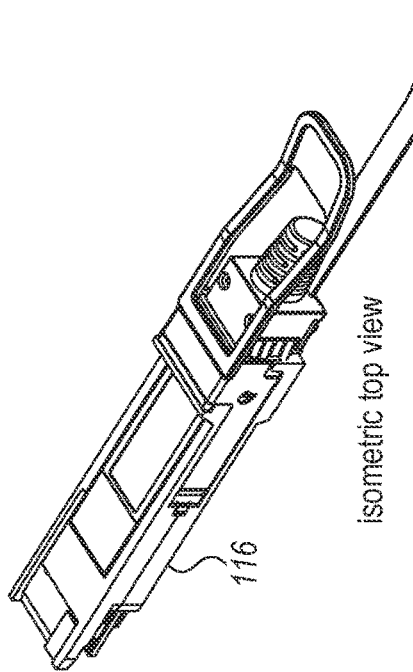
FIG. 2A
top view
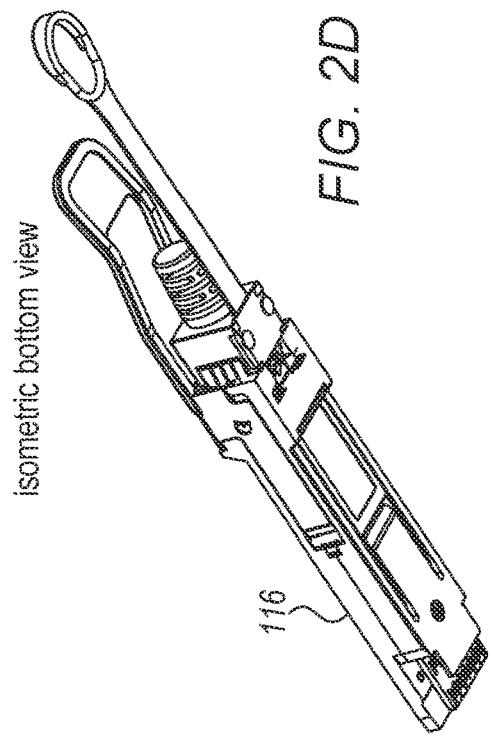
FIG. 2B
isometric top view
FIG. 2D
isometric bottom view
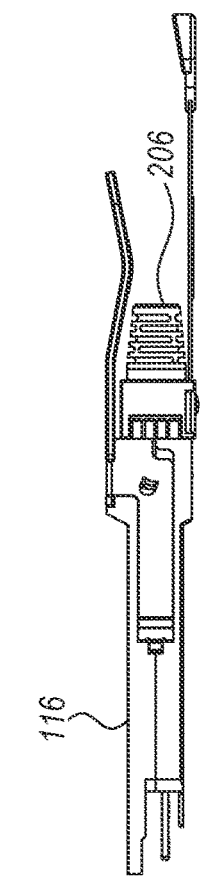
FIG. 2C
side view

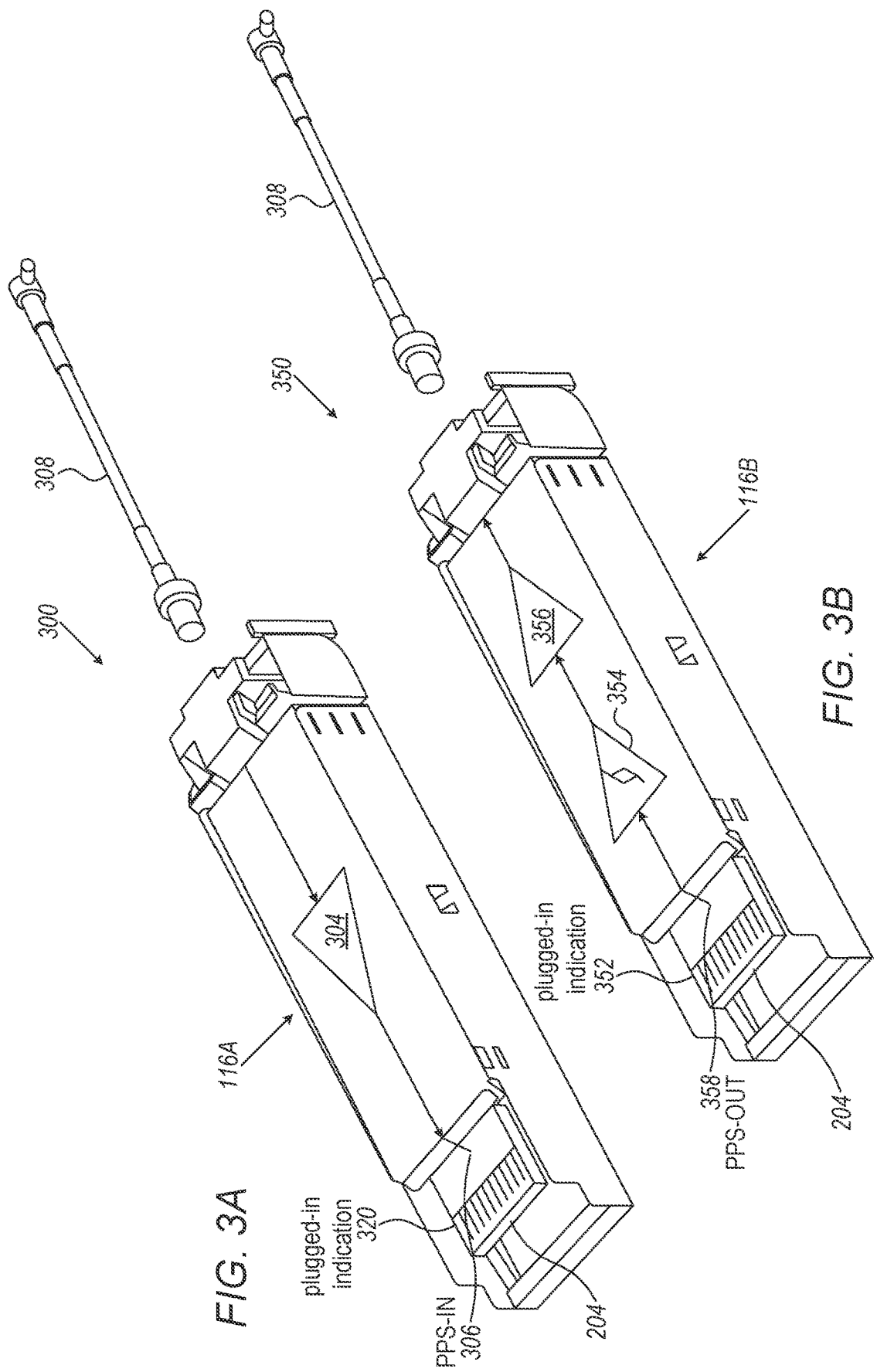

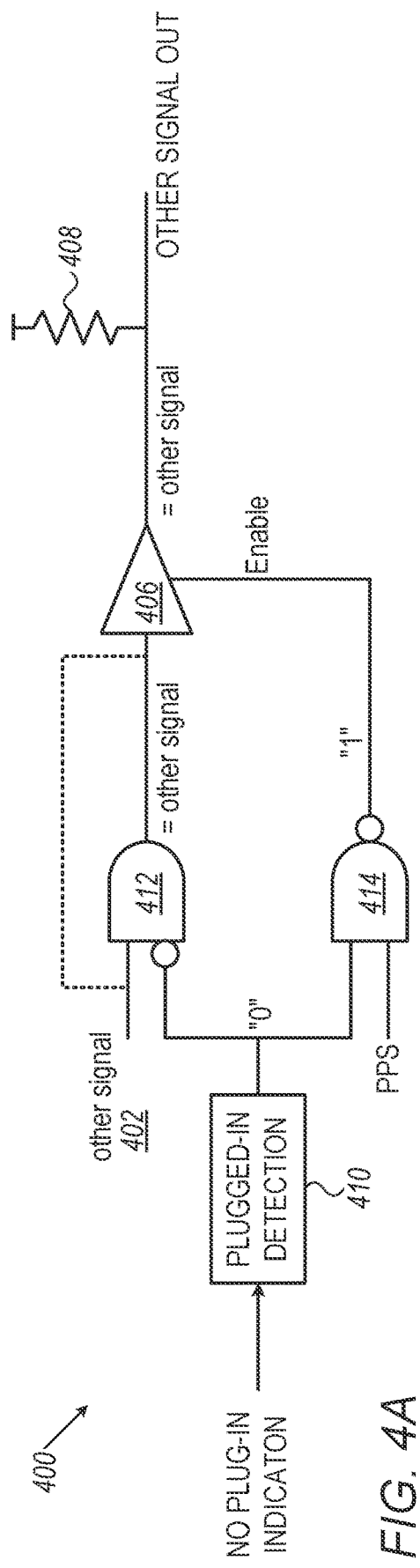
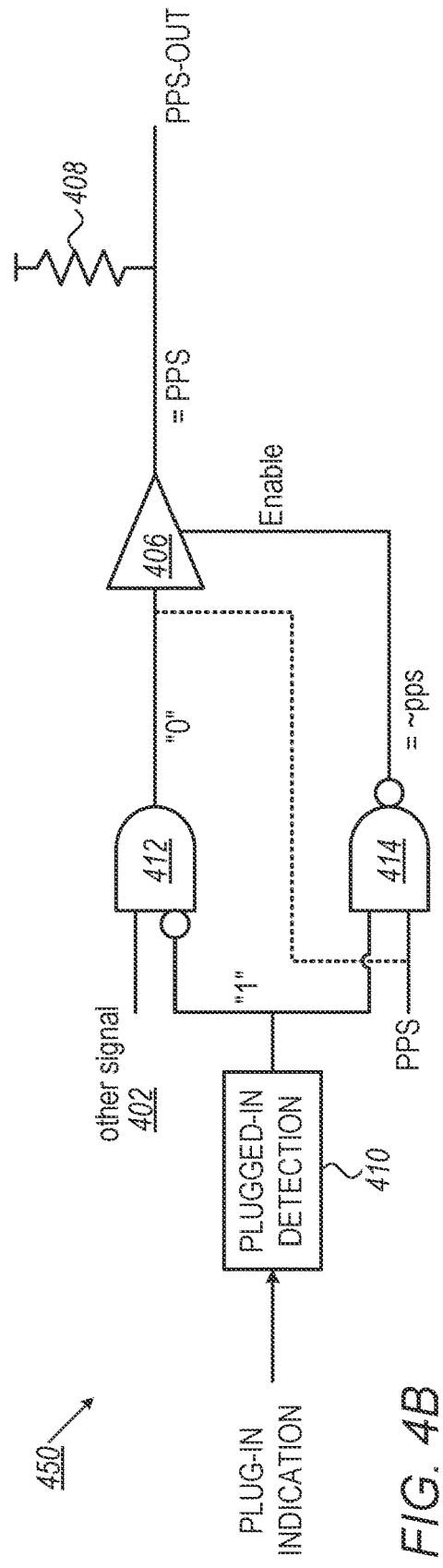
FIG. 4A
FIG. 4B

TIME-SYNCHRONIZATION TESTING IN A NETWORK ELEMENT

CROSS-REFERENCE TO RELATED APPLICATIONS

This application claims the benefit of U.S. Provisional Patent Application 63/012,292, filed Apr. 20, 2020, whose disclosure is incorporated herein by reference.

FIELD OF THE INVENTION

The present invention relates generally to network precision time protocol (PTP), and specifically to testing of PTP synchronization signals.

BACKGROUND

Precision Time Protocol is defined in IEEE standard 1588-2002 (and later versions). The standard is used to synchronize clocks throughout a computer network and may achieve sub-microsecond accuracy.

The IEEE 1588 standard describes a hierarchical master-slave architecture for clock distribution, wherein a time distribution system consists of one or more network segments, and one or more clocks, including a master clock. Network elements may comprise one or more Precision Time Protocol (PTP) hardware clock (PHC), which synchronize to the master clock.

U.S. Pat. No. 8,370,675 describes a method for clock synchronization which includes computing an offset value between a local clock time of a real-time clock circuit and a reference clock time and loading the offset value into a register that is associated with the real-time clock circuit. The local clock time is then summed with the value in the register so as to give an adjusted value of the local clock time that is synchronized with the reference clock.

U.S. Patent Application Publication 2016/0315756 describes a system for testing recovered clock quality and includes a test device for operating as a timing synchronization protocol master for communicating with a device under test functioning as a timing synchronization protocol slave or a timing synchronization protocol boundary clock to synchronize a clock of the device under test with a clock of the test device.

SUMMARY

An embodiment of the present invention that is described herein provides a pluggable module for testing time-synchronization signals of network elements. The pluggable module includes a first connector for connecting to test equipment, a second connector for connecting to a network port of a network element, and at least one driver. The at least one driver is connected between the first and second connectors and is configured to buffer and relay a time-synchronization signal between the network element and the test equipment.

In an embodiment, the pluggable module further includes a pluggable-module-detection signaling circuit that is configured, when plugged into the network port of the network element, to send a transceiver-detection indication over the second connector to the network port. In some embodiments the time-synchronization signal includes a Pulse-Per-Second (PPS) signal. In a disclosed embodiment, the network port of the network element includes a mechanical cage, and the second connector is configured to fit in the mechanical cage and plug to the network port. In an example embodiment, the first connector includes a coaxial connector. In an example embodiment, the second connector includes a Small-Factor Pluggable (SFP) connector.

There is additionally provided, in accordance with an embodiment of the present invention, a network element including a network connector, time-synchronization circuitry and test-signal routing circuitry. The network connector is configured for communicating packets over a network. The time-synchronization circuitry is configured to time-synchronize the network element using a time-synchronization signal. The test-signal routing circuitry is configured, when a pluggable module is plugged into the network connector, to route the time-synchronization signal between the time-synchronization circuitry and the network connector, so as to communicate the time-synchronization signal between the network element and test equipment via the pluggable module.

In an embodiment, the network element further includes a plugged-in detection circuitry that is configured to detect a plugged-in indication through the network connector, the plugged-in indication indicating that the pluggable module is plugged into the network connector.

In an embodiment, the time-synchronization signal includes a Pulse-Per-Second (PPS) signal. In an embodiment, the network connector includes a Small-Factor Pluggable (SFP) connector.

In a disclosed embodiment, the time-synchronization circuitry is configured to generate the time-synchronization signal, and the test-signal routing circuitry is configured to output the time-synchronization signal to the network connector. In another embodiment, the time-synchronization circuitry is configured be synchronized by the time-synchronization signal, and the test-signal routing circuitry is configured to route the time-synchronization signal from the network connector as an input to the time-synchronization circuitry.

There is also provided, in accordance with an embodiment of the present invention, an apparatus including a first network adapter and a second network adapter. The first network adapter is configured to communicate data packets through a network connector with a first packet-data network (PDN). The second network adapter is configured to communicate data packets with a second PDN. The first and second network adapters are configured to connect to one another via respective dedicated connectors, and to transfer a time-synchronization signal between one another via the dedicated connectors. The first network adapter includes time-synchronization circuitry, plugged-in detection circuitry and test-signal routing circuitry. The time-synchronization circuitry is configured to time-synchronize the network adapter using the time-synchronization signal. The plugged-in detection circuitry is configured to detect a plugged-in indication through the network connector, the plugged-in indication indicating that a pluggable module is plugged into the network connector. The test-signal routing circuitry is configured to route the time-synchronization signal via the network connector responsively to the plugged-in indication, so as to communicate the time-synchronization signal between the network element and the pluggable module.

There is further provided, in accordance with an embodiment of the present invention, a method for testing time-synchronization signals of network elements. The method includes connecting a first connector of a pluggable module to test equipment, and connecting a second connector of the pluggable module to a network port of a network element.

Using at least one driver, which is connected in the pluggable module between the first and second connectors, a time-synchronization signal is buffered and relayed between the network element and the test equipment.

There is also provided, in accordance with an embodiment of the present invention, a method in a network element. The method includes communicating packets over a network via a network connector of the network element. The network element time-synchronizing using a time-synchronization signal, by time-synchronization circuitry in the network element. When a pluggable module is plugged into the network connector, the time-synchronization signal is routed between the time-synchronization circuitry and the network connector, so as to communicate the time-synchronization signal between the network element and test equipment via the pluggable module.

There is additionally provided, in accordance with an embodiment of the present invention, a pluggable module for time-synchronization of network elements. The pluggable module includes a first connector for connecting to an external synchronization-signal source, a second connector for connecting to a network port of a network element, and at least one driver. The driver is connected between the first and second connectors and is configured to buffer and relay a time-synchronization signal from the external synchronization-signal source to the network element.

There is further provided, in accordance with an embodiment of the present invention, a network element including a network connector for communicating packets over a network, time-synchronization circuitry configured to time-synchronize the network element using a time-synchronization signal, and synchronization-signal routing circuitry. The synchronization-signal routing circuitry is configured, when a pluggable module is plugged into the network connector, to route the time-synchronization signal from the network connector to the time-synchronization circuitry, so as to synchronize the network element to the time-synchronization signal.

The present invention will be more fully understood from the following detailed description of the embodiments thereof, taken together with the drawings in which:

BRIEF DESCRIPTION OF THE DRAWINGS

FIGS. 2A-2D are mechanical drawings that schematically illustrate a pluggable module for PPS testing, in accordance with an embodiment of the present invention;

FIG. 3A is a mixed mechanical and electrical diagram that schematically illustrates a pluggable module for PPS-IN testing, in accordance with an embodiment of the present invention;

FIG. 3B is a mixed mechanical and electrical diagram that schematically illustrates a pluggable module for PPS-OUT testing, in accordance with an embodiment of the present invention;

FIG. 4A is a block diagram that schematically illustrates the structure of PPS-OUT circuitry in a network element, and indicates the logic values of the nodes therein when the pluggable module is not coupled to the network element, in accordance with an embodiment of the present invention;

FIG. 4B is a block diagram that schematically illustrates the structure of the PPS-OUT circuitry in a network element, and indicates the logic values of the nodes therein when the pluggable module is coupled to the network element, in accordance with an embodiment of the present invention;

DETAILED DESCRIPTION OF EMBODIMENTS

Overview

Figure 1:
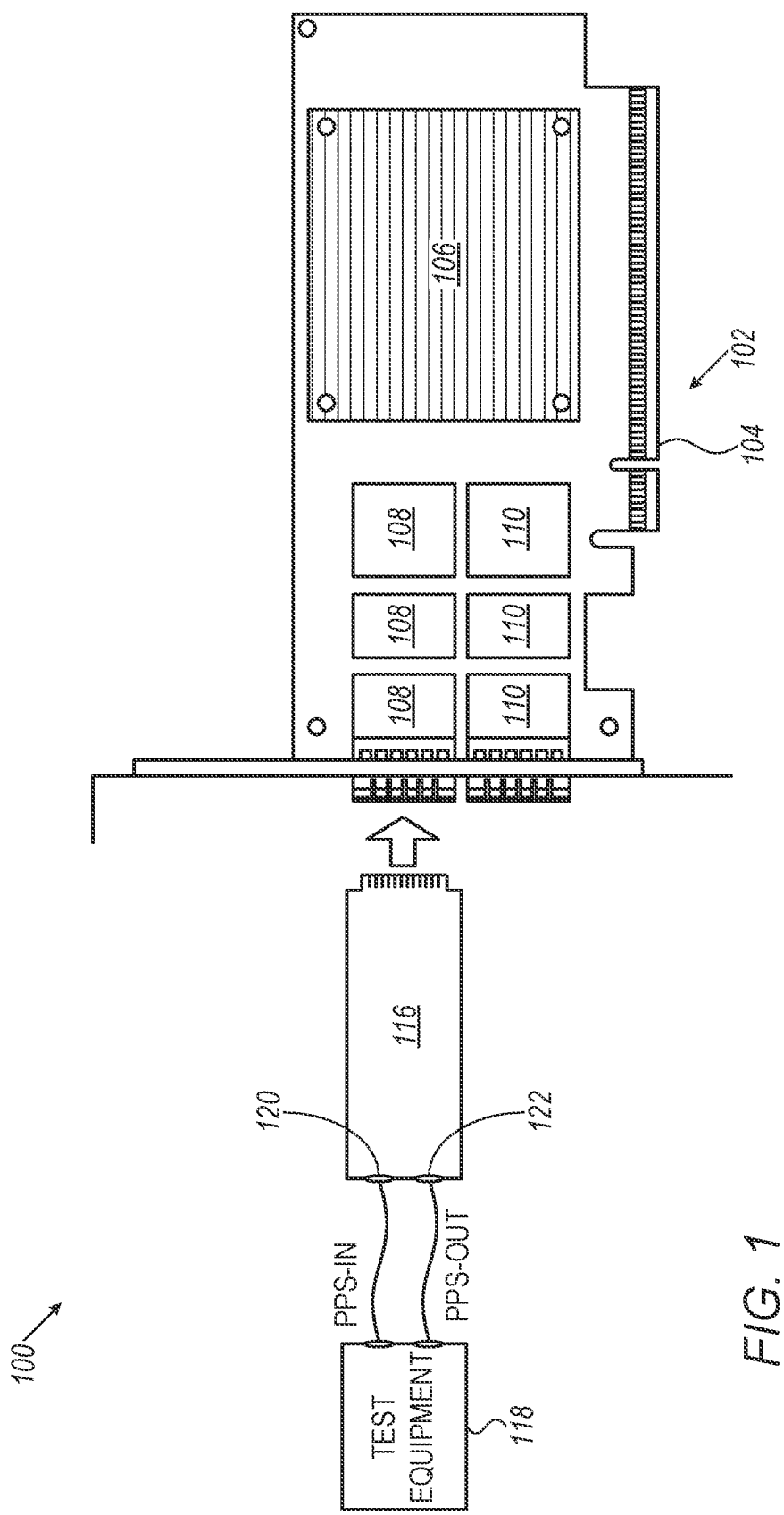
FIG. 1 is a block diagram that schematically illustrates a PPS test setup, in accordance with an embodiment of the present invention.

Network elements such as Network Interface Controllers (NICs) typically connect to a packet switched network through electric or optical cables. The network element may comprise slots (which will be referred to as cages hereinbelow), and the network is coupled to the network element through cable adapters that are configured to fit in the cages and connect to the network element circuitry through one or more sockets that are mounted at the end of the cage.

A network element often comprises a Precision Hardware Clock (PHC) that is synchronized to a master time base in the network. Circuits and modules in the network elements may be time-synchronized to each other by exchanging precise Pulse-Per-Second (PPS) signals, as defined in IEEE 1588-2002 (referenced above). For testing, it may be desirable to connect the PPS signals to a general-purpose or a dedicated test equipment (e.g., an oscilloscope), through high quality connectors (e.g., coaxial connectors such as Subminiature type A (SMA)). However, the PPS signals are not always accessible by a test equipment; for example, in some network elements, the panel size is limited, and additional connectors cannot be added.

Embodiments of the present invention that are described herein provide methods and apparatuses for the testing of PPS signals using the existing cages of the network element that are otherwise used for connection to the network. In an embodiment, a pluggable module is configured to plug into a cage of the network element and to send a "plugged-in" indication to the network element; the network element then routes a PPS-IN and/or a PPS-OUT signal to the pluggable module, which, in turn, routes the PPS-IN and/or PPS-OUT signal to a test equipment; for example, to an oscilloscope for PPS-OUT testing, or to a pulse generator for PPS-IN testing.

In some embodiments, the pluggable module drives a plugged-in-indication pin of the network element connector to logic-0; the network element comprises a pull-up resistor that pulls the pin to logic high when the pluggable module is not plugged. The network element can thus detect that the pluggable module is connected by sensing logic-0 on the plugged-in-indication pin.

In an embodiment, the pluggable module comprises buffers that buffer a PPS-OUT signal from the network element to the test equipment, and/or buffer a PPS-IN signal that the test equipment sends to the network element. In some embodiments, the buffer comprises an hysteresis stage.

In an embodiment, the network element comprises a plugged-in detection circuit that is configured to detect when the pluggable module is plugged into the socket; in some embodiments, the network element is configured, responsively to the detection of a pluggable module, to multiplex a pin of the network socket that is otherwise used for other purposes (or not used) to be used as a PPS-IN pin; in another embodiment the network element is configured, responsively to the detection of a pluggable module, to send a mirror of the PPS-OUT signal to a pin of the network socket that is otherwise used for network signals (or not used).

In yet another embodiment, a synchronizing apparatus is configured to synchronize two networks and comprises a first network interface circuit (NIC) to connect to a first network and a second NIC to connect to a second network. The apparatus is tested by plugging pluggable modules in any of the NICS, thus routing a PPS-IN and/or a PPS-OUT signals to a test equipment.

Thus, in embodiments, PPS-IN and/or PPS-OUT signals can be tested using pluggable modules that connect to cages of the network element that are otherwise used for connecting to the network. Since the disclosed technique reuses an existing connector cage, it does not incur precious panel space for extra connectors for the sake of testing.

System Description

FIG. 1 is a block diagram that schematically illustrates a PPS test setup 100, in accordance with an embodiment of the present invention. The example of FIG. 1 refers to testing of a network adapter 102. The disclosed techniques, however, can be used for testing any other suitable type of network element such as a switch or a router.

In the present example, network adapter 102 comprises an edge connector 104, which is configured to plug into a motherboard (not shown). In an embodiment, other modules may be plugged into the motherboard, including, for example, a host processor, which communicates with a network through network adapter 102. The other modules may exchange signals with the network adapter through busses that are routed in the motherboard.

Network Adapter 102 further comprises circuitry 106, which is configured to communicate packets over a communication network, such as Ethernet or InfiniBand™, or any other suitable packet-switched network. According to the example embodiment illustrated in FIG. 1, network adapter 102 comprises a Small Form-Factor Pluggable (SFP) cage 108 (referred to as a "cage" hereinafter) and an SFP cage 110; both cages are mechanically configured to guide two SFP cable adapters to edge-connector sockets (not shown), which electrically or optically connect the cable adapters to circuitry 106. The cable adapters are typically coupled, directly or indirectly, to the network. In the present context, the term "SFP" is used broadly to describe various cage connectors such as SFP, Double-Density SFP (DD-SFP), Quad-SFP (QSFP), or any other variant of such SFP connector.

In an embodiment, circuitry 106 further comprises a precision time clock (PHC), which may be synchronized by a PPS-IN signal that is input from the motherboard, e.g., through edge connector 104. In another embodiment the PTS may synchronize other modules plugged into the motherboard, by outputting a PPS-OUT signal through edge connector 104, and in yet another embodiment the PTS is synchronized by a PPS-IN signal, and synchronizes other modules by outputting a PPS-OUT signal. (A pulse per second (PPS or 1PPS) signal is an electrical signal that has a width of less than one second and a sharply rising or abruptly falling edge that accurately repeats once per second; the accuracy is typically in the nano-second range.)

According to the example embodiment illustrated in FIG. 1, to test a PPS-IN and/or a PPS-OUT signal, a user unplugs a cable adapter and then inserts a Pluggable-Module 116 in cage 108 (or 110). Pluggable module 116, which will be described in detail below, is configured to send a "plugged-in" indication signal to the circuitry when the pluggable module is galvanically connected to circuitry 116, and circuitry 116 is configured, responsively to detecting the plugged-in indication, to route the PPS-OUT and/or the PPS-IN signals to the pluggable module.

The pluggable module further comprises one or two coaxial connectors, which are used to route the PPS-IN and/or PPS-OUT signal to a Test Equipment 118—a connector 120 for the PPS-IN signal, and a connector 122 for routing the PPS-OUT (in some embodiments, PPS-IN or PPS-OUT only will be tested, and the pluggable module will comprise only one of connectors 120, 122). In the present context, the terms "coaxial connector" refers to a connector in which the signal is transferred via a center pin, which is surrounded by a grounded shield. Non-limiting examples of coaxial connectors are Subminiature Type A (SMA) and Subminiature Type B (SMB) connectors, although any other suitable type of coaxial connector can be used.

Thus, according to the example embodiment illustrated in FIG. 1, users can test the PPS-IN and/or PPS-OUT signals of a network element by unplugging a network cable from a cage, and inserting into the same cage a pluggable module that routes the PPS-IN and/or PPS-OUT signals to an external test equipment.

As would be appreciated, Test Setup 100 illustrated in FIG. 1 and described hereinabove is cited by way of example. Other test setups may be used in alternative embodiments. For example, although the network element illustrated in FIG. 1 comprises two cages, in alternative embodiments network adapters may have any other number of cages. In an embodiment, form factors other than SFP may be used; in another embodiment, the network element includes QSFP cages, and a QSFP-to-SFP adapter is used to couple an SFP pluggable module into the QSFP cage. In some embodiments, the network adapter may connect to the network directly through a panel-mounted coaxial connector, and the pluggable module is a module that plugs to the coaxial connector.

In some embodiments the plugged-in indication may be a signal level on a connector pin; in other embodiments, circuitry 106 continuously attempts to read a flash device (or other non-volatile memory) mounted in the pluggable module, and may generate a plugged-in indication when the flash is successfully read (in those embodiments, the flash is typically used to supply the circuitry with additional information). In yet other embodiments the indication is a proximity signal from a hall-effect device, and in still other embodiments the user signals that the pluggable module is plugged in, for example, by activating a toggle-switch, or by indicating plugged-in to an operating system, which will, in turn, send an indication signal to the circuitry.

FIGS. 2A-2D are mechanical drawings that schematically illustrate pluggable module 116, in accordance with an embodiment of the present invention. Four projections are shown—FIG. 2A shows a top-view 116-top, FIG. 2B shows a diagonal-top view, FIG. 2C shows a side-view, and FIG. 2D shows a diagonal-bottom view. The module described in FIGS. 2A-2D mechanically conforms to small form-factor pluggable (SFP) cage definitions.

According to the example embodiment illustrated in FIGS. 2A-2D, Pluggable Module 116 comprises a mechanical case 202, which is configured to fit into cage 108 or 110 (FIG. 1), an edge connector 204, which is configured to plug into a suitable socket mounted on network element 102 (and coupled to circuitry 106), a coaxial connector 206 (for example an SMA connector)), operable to couple PPS-IN and/or PPS-OUT signals to a test equipment, and a handle 208, which may be used to extract the pluggable module from the cage.

As would be appreciated, the mechanical drawing illustrated in FIGS. 2A-2D and described hereinabove is cited by way of example. Other suitable forms and shapes may be used in alternative embodiments. For example, in some embodiments QSFP form factor may be used. In an embodiment, the pluggable module comprises two coaxial connectors, for simultaneous testing of both PPS-IN and PPS-OUT. In some embodiments, the coaxial connector may be SMB and in other embodiments any other suitable type connector may be used; including, for example, Shielded Twisted Pair (STP) connectors.

FIG. 3A is a mixed mechanical and electrical diagram 300 that schematically illustrates a pluggable module for PPS-IN testing, in accordance with an embodiment of the present invention. A Pluggable Module 116A comprises an edge connector 204, which is configured to plug into a suitable socket mounted on network element 102 (FIG. 1). According to the example embodiment illustrated in FIG. 3A, pluggable module 116A sends a plugged-in indication 302 on one of the edge connector pins (for example, the pluggable module may short the pin to ground). In an embodiment, the pluggable module sends a plugged-in indication signal on an edge connector pin that is not used when a cable adapter is plugged in the network element cage.

Pluggable module 116A comprises a buffer 304, which is configured to match the impedance of an input PPS-IN signal (sent, for example, by a test equipment), and to send a buffered PPS-IN signal through pin 306 of the edge connector to the network element.

Pluggable module 116A further comprises a coaxial connector 206 (FIG. 2C; hidden in FIG. 3A), which is coupled to the input of buffer 304. A coaxial cable 308 may be used to connect the coaxial connector to a test equipment (e.g., a pulse generator, not shown).

FIG. 3B is a mixed mechanical and electrical diagram 350 that schematically illustrates a pluggable module for PPS-OUT testing, in accordance with an embodiment of the present invention. A Pluggable Module 116B comprises an edge connector 204, configurable to plug into a suitable socket of network element 102. Pluggable module 116B may be mechanically identical to pluggable module 116A illustrated in FIG. 3A.

Like pluggable module 116A, pluggable module 116B sends a plugged-in indication 352 on one of the edge connector pins (for example, the pluggable module may short the pin to ground). In an embodiment, the pluggable module sends a plugged-in indication signal on an edge connector pin that is not used when a cable adapter is plugged in the network element cage.

Pluggable module 116B comprises a hysteresis buffer 354, which is configured to mitigate overshoots in the PPS-OUT signal that the network element sends through edge connector 204, followed by a buffer 356, which is configured to drive a terminated coaxial cable 308 through a coaxial connector 208 (hidden). The coaxial cable may be connected to a test equipment (e.g., an oscilloscope).

As would be appreciated, the electrical and mechanical structures of pluggable modules 116A and 116B, illustrated in the example embodiments of FIGS. 3A and 3B and described above are cited by way of example. Other suitable structures may be used in alternative embodiments. For example, other form factors may be used; in an embodiment, buffer 356 comprises an hysteresis input stage and, thus, hysteresis buffer 354 is not used. In another embodiment, pluggable module 116A comprises a hysteresis buffer and in yet another embodiment hysteresis buffers are not used for either PPS-IN or PPS-OUT buffering.

In an embodiment, pluggable module 116 may comprise both an input buffer and an output buffer, coupled to two coaxial connectors, and used for PPS-IN and PPS-OUT testing. In another embodiment, the pluggable module comprises an input buffer and an output buffer, which share a single coaxial connector.

In some alternative embodiments, plugging-in of the module is indicated by magnetic coupling; in other embodiments plugging-in is indicated by optical coupling and in yet other embodiment there is no direct plugged-in indication (instead, a user-operated switch or software configuration may be used).

FIG. 4A is a block diagram that schematically illustrates the structure of a PPS-OUT circuitry 400 in a network element, and indicates the logic values of the nodes therein when the pluggable module is not coupled to the network element, in accordance with an embodiment of the present invention. A signal 402 (designated "other signal", which is one of the signals that are output from circuit 106 to a cable adapter that may be plugged in cage 108 (FIG. 1), is selected for sending the PPS signal to the test equipment. The signal is logically routed as shown by the dashed line, to an open-source buffer 406 and thence to the cable adapter (a passive pull-up device 408 pulls the signal high when not driven low by buffer 406).

When the pluggable module is not coupled to the network element, a Plugged-In Detection circuit 410 outputs a logic-0. In some embodiment, the pluggable module signals that it is plugged in by pulling a connector pin low; the Plugged-In Detection circuit comprises a pull-up resistor and an inverter, which outputs low when the input is not driven low and high when the input is driven low.

When Plugged-In Detection circuit 410 output a logic-0, an And-gate 412 transfers other signal 402 to the input of buffer 406, and an And-gate 412 outputs a logic-1 to the enable input of buffer 406. Thus, when the pluggable module is not plugged in, and, instead, a cable-adapter is plugged into the same cage, the network element will output the other signal, buffered by buffer 406, to the cable adapter.

FIG. 4B is a block diagram 450 that schematically illustrates the structure of the PPS-OUT circuitry in a network element, and indicates the logic values of the nodes therein when the pluggable module is coupled to the network element, in accordance with an embodiment of the present invention. A PPS signal is logically routed, as shown by the dashed line, to buffer 406 and thence to the pluggable module (a passive pull-up device 408 pulls the signal high when not driven low by buffer 406). The buffered signal, designated PPS-OUT, may be further buffered at the pluggable module and forwarded to a test equipment.

When the pluggable module is coupled to the network element, Plugged-In Detection circuit 410 outputs a logic-1; And gate 412 will output logic-0, and And gate 414 will output the inverse of the PPS signal (~pps) to the Enable input of buffer 406. Buffer 406 will, thus, replicate the PPS signals; the replicated PPS signal is then output to the pluggable module.

Figure 5:
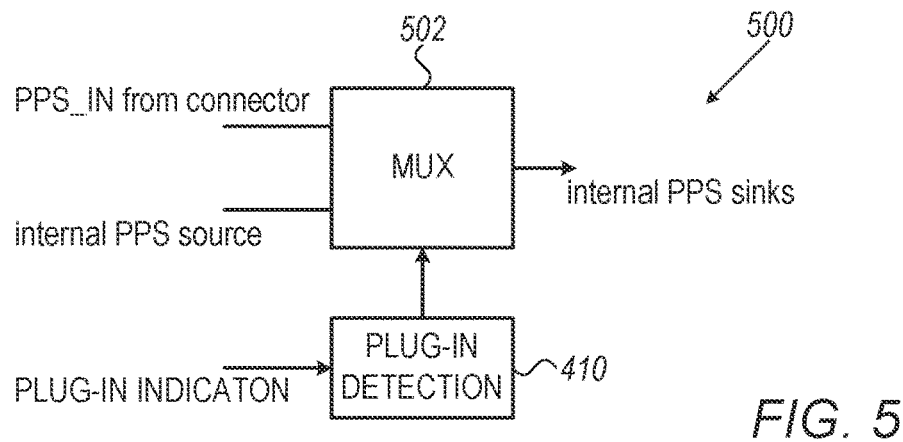
FIG. 5 is a block diagram that schematically illustrates the structure of a PPS-IN multiplexing circuit, in accordance with an embodiment of the present invention.

FIG. 5 is a block diagram that schematically illustrates the structure of a PPS-IN multiplexing circuit 500, in accordance with an embodiment of the present invention. The Plug-In Detection circuit 410 (FIGS. 4A, 4B) controls a multiplexer 502, to route either an external PPS signal that is input from the pluggable module or an internal PPS source, to PPS sinks in the network element, responsively to detecting a pluggable module.

As would be appreciated, circuits 400 and 500, illustrated in FIGS. 4A, 4B and 5 and described hereinabove are cited by way of example. Other suitable circuits may be used in alternative embodiments. For example, a push-pull buffer may be used in lieu of buffer 406, with a suitably modified multiplexing scheme; in some embodiments, two shorted buffers are used, one for the PPS and the other for the "other signals", and the plugged-in detection circuit controls which of the two buffers will be enabled.

Figure 6A:
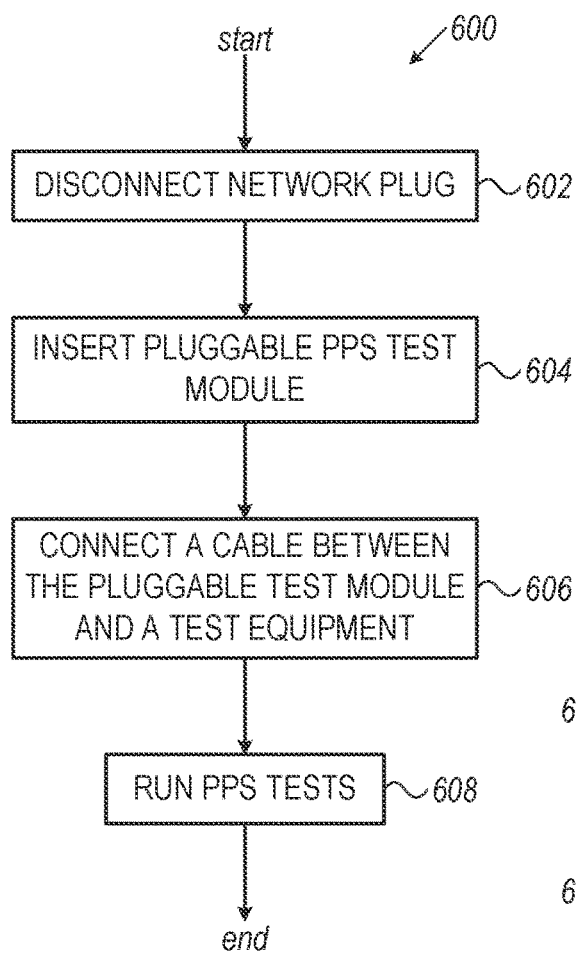
FIG. 6A is a flowchart that schematically illustrates a method for testing PPS signals, in accordance with an embodiment of the present invention.

FIG. 6A is a flowchart 600 that schematically illustrates a method for testing PPS signals, in accordance with an embodiment of the present invention; The flow is executed by a user, which will be referred to as Test Engineer hereinbelow.

The flow starts at a Disconnect-Network-Plug step 602, wherein the test engineer unplugs the network cable adapter from the network element. Next, at an Insert-Pluggable-Module step 604, the test engineer plugs a PPS-testing pluggable module into a cage of the network element (e.g., cage 108, FIG. 1).

Next, at a Connect-Cable step 606, the test engineer connects a coaxial cable from the pluggable module to the test equipment (the cable may be PPS-IN or PPS-OUT); and, at a Run-PPS-Tests step 608, the test engineer may commence PPS testing using the test equipment.

As would be appreciated, the method illustrated in FIG. 6A is an example and cited for the sake of conceptual clarity. Other methods may be used in alternative embodiments— (e.g., the user may connect the coaxial cable to the pluggable module before plugging the module into the cage).

Figure 6B:
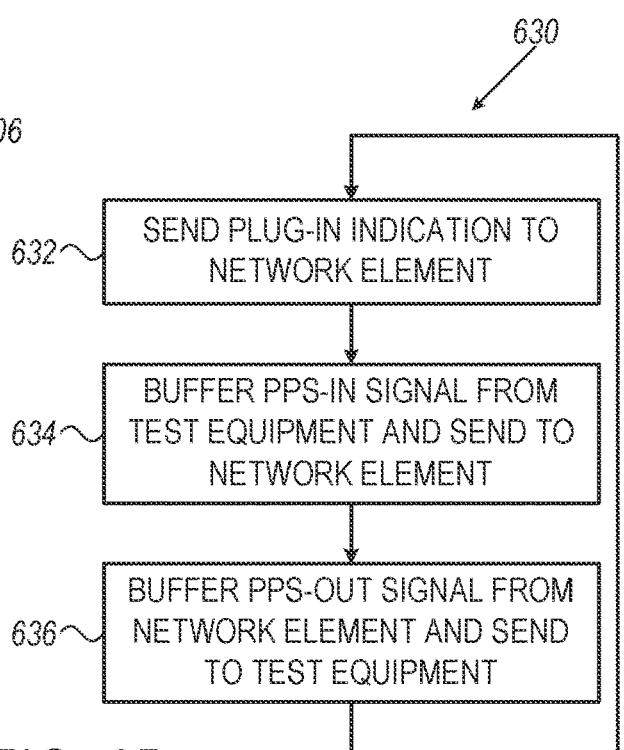
FIG. 6B is a flowchart that schematically illustrates a method for testing PPS signals using a pluggable module, in accordance with an embodiment of the present invention.

FIG. 6B is a flowchart 630 that schematically illustrates a method for testing PPS signals using a pluggable module, in accordance with an embodiment of the present invention. The flow is executed by the pluggable module. At a Send-Indication step 632, the pluggable module sends an indication to the network element that the pluggable module is plugged in the cage. The indication may be, for example, shorting a connector pin to ground.

According to the example embodiment illustrated in FIG. 6B, the pluggable module supports both PPS-IN and PPS-OUT signals. In a Buffer-PPS-In step 634 the pluggable module buffers a PPS-IN signal sent from a test equipment over a first coaxial cable and sends the buffered signal to the network element, and, in a Buffer-PPS-Out step 636, the pluggable module buffers a PPS-OUT signal that the network element sends, and sends the buffered PPS-OUT signal to the test equipment, through a second coaxial cable.

As would be appreciated, the method illustrated in FIG. 6B is cited by way of example, and refers to embodiments in which the pluggable module and the network element support simultaneous testing of both PPS-IN and PPS-Out (and, hence, the pluggable module comprises two buffers). In some embodiments, both the network element and the pluggable module support PPS-IN testing only, and step 636 of flowchart 630 is skipped; in other embodiments, both the network element and the pluggable module support PPS-OUT testing only, and step 634 is skipped. In yet other embodiment, the pluggable module comprises both a PPS-IN and a PPS-OUT buffer, (which share the same coaxial cable) and determines which buffer should be used responsively to an indication that the network element sends (e.g., on a connector pin).

Figure 6C:
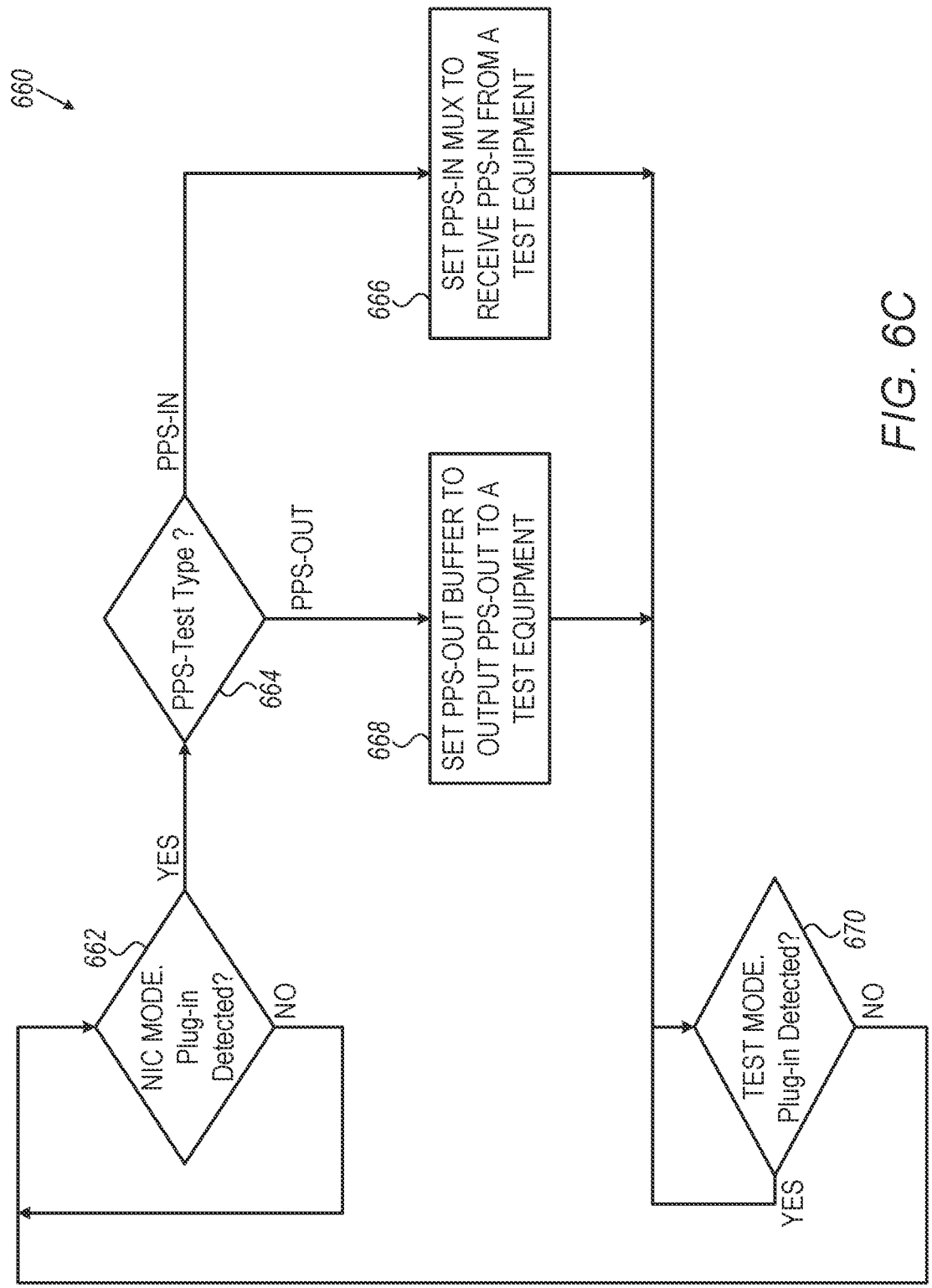
FIG. 6C is a flowchart that schematically illustrates a method for testing PPS signals in a network element, in accordance with an embodiment of the present invention.

FIG. 6C is a flowchart 660 that schematically illustrates a method for testing PPS signals in a network element, in accordance with an embodiment of the present invention. The flow is executed by network element 102 (FIG. 1).

The flow starts at a NIC-Mode step 662, wherein the network element executes normal network operations (e.g., sending and receiving network packets), while checking for a plug-in indication (e.g., a logic-0 level on one of the network connection pins). If the network element does not detect a plug-in indication, the network element remains in step 662, and continues to communicate packets over the network. If, in step 662, the network element detects a plug-in indication, the network element enters a Check-PPS-Type step 664, and checks if the signal to be tested is the PPS-IN or the PPS-OUT. If PPS-IN is to be tested, the network element enters a Set-PPS-IN-Mux step 666, and sets a multiplexer (e.g., Multiplexer 502, FIG. 5) to route an external PPS-IN signal to PPS-IN sinks in the network element. If, in step 664, the signal to be tested is PPS-OUT, the network element enters a Set-PPS-OUT-Buffer step 668, and sets a buffer (e.g., Buffer 406, FIG. 4B) to route the internal PPS-OUT signal, through the pluggable module, to the test equipment.

After step 666 or 668, the network element enters a Test-Mode step 670, in which a user may test the PPS-IN signal or the PPS-OUT signal. While in step 670, the network element continuously checks the status of the plug-in indication, to detect when the test mode ends; and remains in step 670 as long as the plug-in indication is on. If, in step 670, the network element does not detect a plug-in indication, the network element returns to NIC-Mode step 662.

As would be appreciated, the flow-chart illustrated in the example embodiment of FIG. 6 and described above is cited by way of example. Other suitable flowcharts may be used in alternative embodiments. For example, in some embodiments, the network element does not check, in step 670, if the plug-in indication is on—instead, when reconnecting the network element to the network, the user resets the system, and, responsively to a reset indication, the network element enters the NIC Mode (which may be the default mode). In some embodiments, PPS-IN and PPS-OUT may be concurrently tested, and the flowchart modified accordingly.

Figure 7:
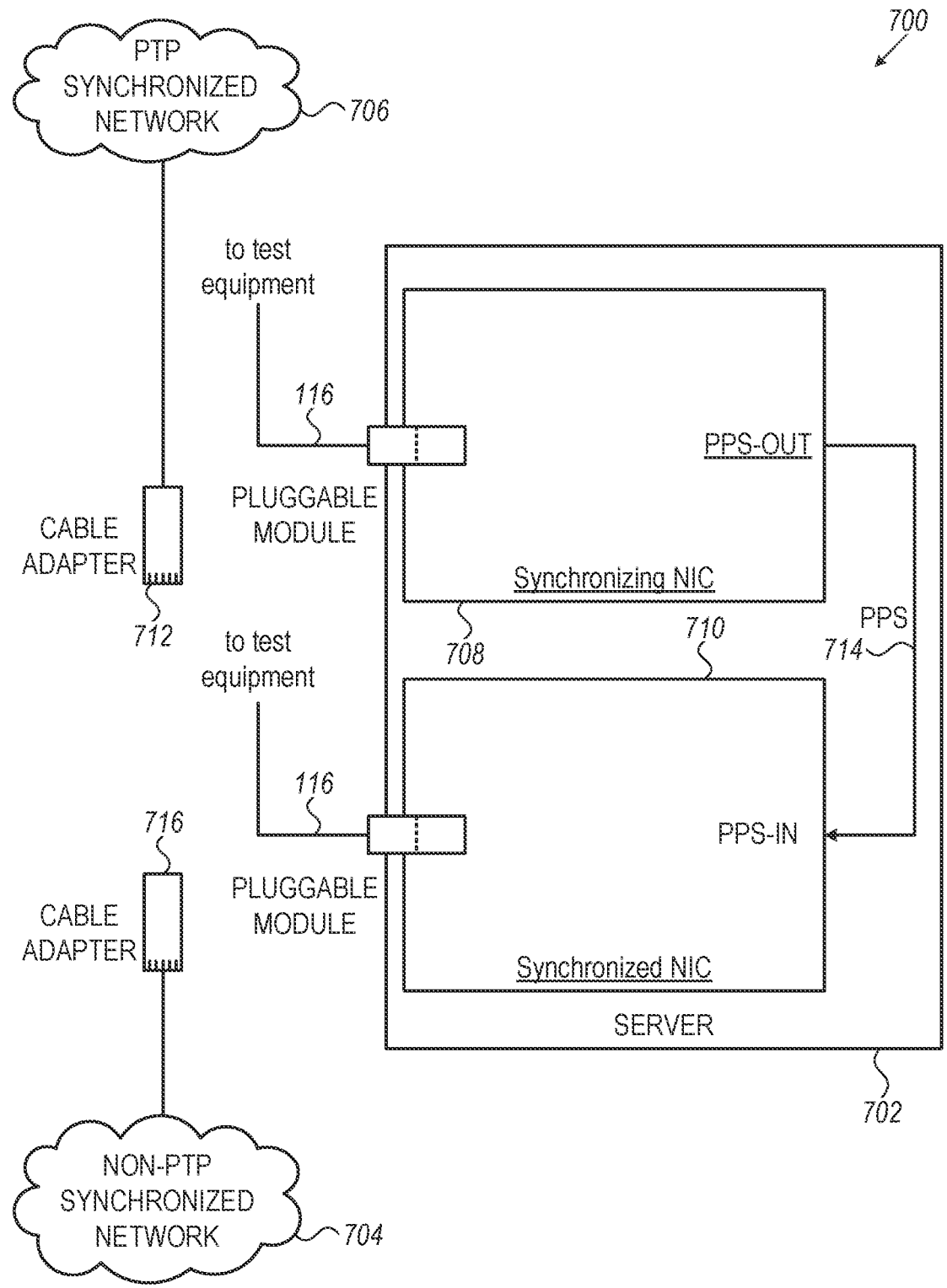
FIG. 7 is a block diagram that schematically illustrates the structure of a cross-network time synchronization apparatus and a PPS testing thereof, in accordance with an embodiment of the present invention.

FIG. 7 is a block diagram that schematically illustrates the structure of a cross-network time synchronization apparatus 702 and a setup for PPS testing thereof, in accordance with an embodiment of the present invention. Apparatus 702, which may be, for example, a server (and will sometimes be referred to as "server" hereinbelow), is configured to synchronize a non-PTP-Synchronized Network 704 to a PTP-Synchronized Network 706. The server comprises a synchronizing Network Interface Controller (NIC) 708 that is coupled to the PTP-Synchronized network 706, and sends a PPS signal 714 to a Synchronized NIC 710. Synchronized NIC 710 is configured to receive the PPS signal, to synchronize an internal counter to the PTP-synchronized Network 706, and, thus, to synchronize network elements that are coupled to the Non-PTP-Synchronized Network 704 to the PTP-Synchronized Network 706. The structure of and methods of cross-network time-synchronization apparatus 702 are described, for example, in U.S. patent application Ser. No. 16/799,873, entitled "PHC Chaining," which is assigned to the assignee of the present patent application and whose disclosure is incorporated herein by reference.

The example embodiment illustrated in FIG. 7 comprises a testing setup for the PPS signals of Server 702. To test Synchronizing-NIC 708, the user (e.g., a test engineer) may unplug a Cable-Adapter 712 from a cage of Synchronizing NIC 708, thus disconnecting the NIC from network 706, and plug a Pluggable Adapter 116 in the cage. Synchronizing NIC 708 may comprise a plug-in detection circuitry and a PPS-IN Multiplexing circuitry, which may be identical or similar to Plug-In Detection circuit 410 and PPS-IN Multiplexing circuitry 500 (FIG. 5). Thus, Synchronizing NIC 708 will use the PPS signal that a test equipment sends as a precision time base.

To test Synchronized-NIC 710, a test engineer may unplug a Cable-Adapter 716 from a cage of the Synchronized NIC 710, thus disconnecting the NIC from network 704, and plug a Pluggable Adapter 116 in the cage. Synchronized NIC 710 may comprise a plug-in detection circuitry and a PPS-OUT circuitry, which may be identical or similar to Plug-In Detection circuit 410 and PPS-OUT circuitry 450 (FIG. 4). Thus, Synchronized NIC 702 will route the PPS-OUT signal to a test equipment, such as an oscilloscope.

As would be appreciated, the structure of cross-network time synchronization server 702 and the PPS testing setup thereof illustrated in FIG. 7 and described above are cited by way of example. Other suitable structures may be used in alternative embodiments. For example, in some embodiments, Server 702 may comprise a single NIC that is configured to synchronize a non-synchronized network that is coupled to the NIC through a first cage to a second network that is coupled to the NIC through a second cage; a pluggable adapter may be plugged to any or both cages, to allow testing of PPS-IN and PPS-OUT signals.

The configuration of Network Element 102, including plugged-in detection circuitry 410, PPS-IN multiplexing circuitry 500 and PPS-OUT circuitry 400; the configurations of Pluggable Module 116, input buffer 304 and output buffers 352, 354; PPS testing methods 600, 630 and 660; and the configuration of synchronizing apparatus 700 and the PPS setup thereof, illustrated in FIGS. 1 through 7 and described hereinabove, are example configurations and methods that are depicted purely for the sake of conceptual clarity. Any other suitable configurations and flowcharts can be used in alternative embodiments. The network element, the synchronizing server, the pluggable module and components thereof may be implemented using suitable hardware, such as in one or more Application-Specific Integrated Circuit (ASIC) or Field-Programmable Gate Arrays (FPGA), using software, using hardware, or using a combination of hardware and software elements. In some embodiments, network element 102 and/or synchronizing apparatus 700 comprise a general-purpose processor, which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

Although the embodiments described herein mainly address testing of PTP signals, the methods and systems described herein can also be used in other suitable applications. For example, the disclosed pluggable modules can be used for synchronizing a network element to an external source that provides a PPS signal or other time-synchronization signal. In other words, instead of connecting the pluggable module to test equipment, the pluggable module can be connected to an external synchronization-signal source. In the network element, synchronization-signal routing circuitry can be used for detecting that the pluggable module is plugged into a network connector, and, when detected, to route the time-synchronization signal (e.g., PPS signal) from the network connector to the time-synchronization circuitry of the network element, so as to synchronize the network element to the time-synchronization signal. Further aspects relating to synchronization of network elements are addressed in U.S. patent application Ser. No. 17/148,605, filed Jan. 14, 2021, whose disclosure is incorporated herein by reference.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A pluggable module for testing time-synchronization signals of network elements, the network elements connectable to networks, the pluggable module comprising:
   a first connector for connecting to test equipment and receiving a time-synchronization test signal;
   a second connector comprising a mechanical cage connector for connecting to a network port at a socket mounted at the end of a mechanical cage of a network element, the socket being the same socket through which the network element also connects to a network; and
   at least one driver, which is connected between the first and second connectors and is configured to buffer and relay the time-synchronization test signal comprising a Pulse-Per-Second (PPS) signal between the network element and the test equipment.

2. The pluggable module according to claim 1, further comprising a pluggable-module-detection signaling circuit, configured, when plugged into the network port of the network element, to send a transceiver-detection indication over the second connector to the network port.

3. The pluggable module according to claim 1, wherein the second connector is configured to fit in the socket of the mechanical cage and plug to the network port.

4. The pluggable module according to claim 1, wherein the first connector comprises a coaxial connector.

5. The pluggable module according to claim 1, wherein the socket comprises a Small-Factor Pluggable (SFP) connector.

6. A network element, comprising:
   a network connector including a socket mounted at the end of a mechanical cage of the network element, the socket through which a connection is made to a network, for communicating packets over the network;
   time-synchronization test circuitry, configured to time-synchronize the network element using a time-synchronization test signal comprising a Pulse-Per-Second (PPS) signal; and
   test-signal routing circuitry, which is configured, when a pluggable module including a mechanical cage connector is plugged into the socket of the network connector, which is the same socket through which the connection is made to the network, to route the time-synchronization test signal between the time-synchronization test circuitry and the network connector, so as to communicate the time-synchronization test signal between the network element and test equipment via the pluggable module.

7. The network element according to claim 6, further comprising a plugged-in detection circuitry, configured to detect a plugged-in indication through the network connector, the plugged-in indication indicating that the pluggable module is plugged into the network connector.

8. The network element according to claim 6, wherein the time-synchronization test circuitry is configured to generate the time-synchronization test signal, and wherein the test-signal routing circuitry is configured to output the time-synchronization test signal to the network connector.

9. The network element according to claim 6, wherein the time-synchronization test circuitry is configured be synchronized by the time-synchronization test signal, and wherein the test-signal routing circuitry is configured to route the time-synchronization test signal from the network connector as an input to the time-synchronization test circuitry.

10. The network element according to claim 6, wherein the socket comprises a Small-Factor Pluggable (SFP) connector.

11. An apparatus, comprising:
a first network adapter, configured to communicate data packets through a network connector with a first packet-data network (PDN); and
a second network adapter, configured to communicate data packets with a second PDN, wherein the first and second network adapters are configured to connect to one another via respective dedicated connectors, and to transfer a time-synchronization test signal comprising a Pulse-Per-Second (PPS) signal between one another via the dedicated connectors, and wherein the first network adapter comprises:
time-synchronization test circuitry, configured to time-synchronize the network adapter using the time-synchronization test signal;
plugged-in detection circuitry, configured to detect a plugged-in indication through the network connector including a socket mounted at the end of a mechanical cage of a network element associated with the first PDN, the plugged-in indication indicating that a pluggable module including a mechanical cage connector is plugged into the network connector at the socket mounted at the end of the mechanical cage of the network element, the socket being the same socket through which the network element also connects to a network; and
test-signal routing circuitry, configured to route the time-synchronization test signal via the network connector responsively to the plugged-in indication, so as to communicate the time-synchronization test signal between the network element and the pluggable module.

12. A method for testing time-synchronization signals of network elements, the network elements connected to networks, the method comprising:
connecting a first connector of a pluggable module to test equipment and receiving a time-synchronization test signal;
connecting a second connector comprising a mechanical cage connector of the pluggable module to a network port at a socket mounted at the end of a mechanical cage of a network element, the socket being the same socket through which the network element also connects to a network; and
using at least one driver, which is connected in the pluggable module between the first and second connectors, buffering and relaying the time-synchronization test signal comprising a Pulse-Per-Second (PPS) signal between the network element and the test equipment.

13. The method according to claim 12, further comprising sending a transceiver-detection indication over the second connector to the network port, using a pluggable-module-detection signaling circuit in the pluggable module.

14. The method according to claim 12, wherein the second connector is configured to fit in the socket of the mechanical cage and plug to the network port.

15. The method according to claim 12, wherein the first connector comprises a coaxial connector.

16. The method according to claim 12, wherein the socket comprises a Small-Factor Pluggable (SFP) connector.

17. A method in a network element, the method comprising:
communicating packets over a network via a network connector of including a socket mounted at the end of a mechanical cage of the network element, when the network element is connected to the network via the socket;
time-synchronizing the network element using a time-synchronization test signal comprising a Pulse-Per-Second (PPS) signal, by time-synchronization test circuitry in the network element; and
when a pluggable module including a mechanical cage connector is plugged into the socket of the network connector, which is the same socket through which the connection is made to the network, routing the time-synchronization test signal between the time-synchronization test circuitry and the network connector, so as to communicate the time-synchronization test signal between the network element and test equipment via the pluggable module.

18. The method according to claim 17, wherein routing the time-synchronization test signal comprises detecting, through the network connector, a plugged-in indication indicating that the pluggable module is plugged into the network connector.

19. The method according to claim 17, wherein time-synchronizing the network element comprises generating the time-synchronization test signal in the time-synchronization test circuitry, and wherein routing the time-synchronization test signal comprises outputting the time-synchronization test signal to the network connector.

20. The method according to claim 17, wherein time-synchronizing the network element comprises synchronizing the time-synchronization test circuitry by the time-synchronization test signal, and wherein routing the time-synchronization test signal comprises routing the time-synchronization test signal from the network connector as an input to the time-synchronization test circuitry.

21. The method according to claim 17, wherein the socket comprises a Small-Factor Pluggable (SFP) connector.

22. A pluggable module for time-synchronization of network elements, the network elements connectable to networks, the pluggable module comprising:
a first connector for connecting to an external synchronization-signal source and receiving a time-synchronization test signal;

a second connector comprising a mechanical cage connector for connecting to a network port at a socket mounted at the end of a mechanical cage of a network element, the socket being the same socket through which the network element also connects to a network; and at least one driver, which is connected between the first and second connectors and is configured to buffer and relay the time-synchronization test signal comprising a Pulse-Per-Second (PPS) signal from the external synchronization-signal source to the network element.

23. A network element, comprising:

a network connector including a socket mounted at the end of a mechanical cage of the network element, the socket being the same socket through which a connection is made to a network for communicating packets over the network;

time-synchronization test circuitry, configured to time-synchronize the network element using a time-synchronization test signal comprising a Pulse-Per-Second (PPS) signal; and synchronization-signal routing circuitry, which is configured, when a pluggable module including a mechanical cage connector is plugged into the socket of the network connector, to route the time-synchronization test signal from the network connector to the time-synchronization test circuitry, so as to synchronize the network element to the time-synchronization test signal.

* * * * *